(12) United States Patent
Ishii et al.

(10) Patent No.: US 6,819,834 B2
(45) Date of Patent: Nov. 16, 2004

(54) OPTICAL FIBER GRATING, OPTICAL FIBER GRATING MANUFACTURING METHOD, AND OPTICAL FIBER GRATING MANUFACTURING APPARATUS

(75) Inventors: Yuu Ishii, Sakura (JP); Michihiro Nakai, Sakura (JP); Satoshi Okude, Sakura (JP); Kenji Nishide, Sakura (JP); Kensuke Shima, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/929,934

(22) Filed: Aug. 15, 2001

(65) Prior Publication Data

US 2002/0025117 A1 Feb. 28, 2002

(30) Foreign Application Priority Data

Aug. 29, 2000 (JP) ........................... 2000-259872
Jun. 28, 2001 (JP) ........................... 2001-197311

(51) Int. Cl.[7] .................................. G02B 6/34
(52) U.S. Cl. ........................... 385/37; 438/32
(58) Field of Search ...................... 385/37; 438/32

(56) References Cited

U.S. PATENT DOCUMENTS

| | | | | |
|---|---|---|---|---|
| 5,949,934 A | * | 9/1999 | Shima et al. | 385/128 |
| 6,221,566 B1 | * | 4/2001 | Kohnke et al. | 385/123 |
| 6,222,973 B1 | * | 4/2001 | Starodubov | 385/128 |
| 6,289,154 B1 | * | 9/2001 | Tsuda et al. | 385/37 |
| 6,356,681 B1 | * | 3/2002 | Chen et al. | 359/130 |
| 6,370,301 B1 | * | 4/2002 | Kokura | 359/566 |
| 6,456,762 B1 | * | 9/2002 | Nishiki et al. | 385/37 |

FOREIGN PATENT DOCUMENTS

| | | |
|---|---|---|
| DE | 196 21 112 A1 | 11/1997 |
| EP | 0 805 365 A2 | 11/1997 |
| WO | WO 98/18031 | 4/1998 |
| WO | WO 00/49437 | 8/2000 |

* cited by examiner

Primary Examiner—Robert H. Kim
Assistant Examiner—Richard H Kim
(74) Attorney, Agent, or Firm—Chadbourne & Parke, LLP

(57) ABSTRACT

The invention provides a method and apparatus that precisely and efficiently improves the optical properties of an optical fiber grating. Preferably hydrogen loading processing, grating formation processing that forms a grating part by irradiation with ultraviolet light at a predetermined period, and preferably dehydrogenation, adjusting the optical properties by a suitable combination of uniform ultraviolet irradiation processing that irradiates the grating part as a whole with ultraviolet light and heat trimming processing, and finally heat aging is carried out.

4 Claims, 8 Drawing Sheets

TARGET PROPERTIES AND
MANUFACTURING TOLERANCES

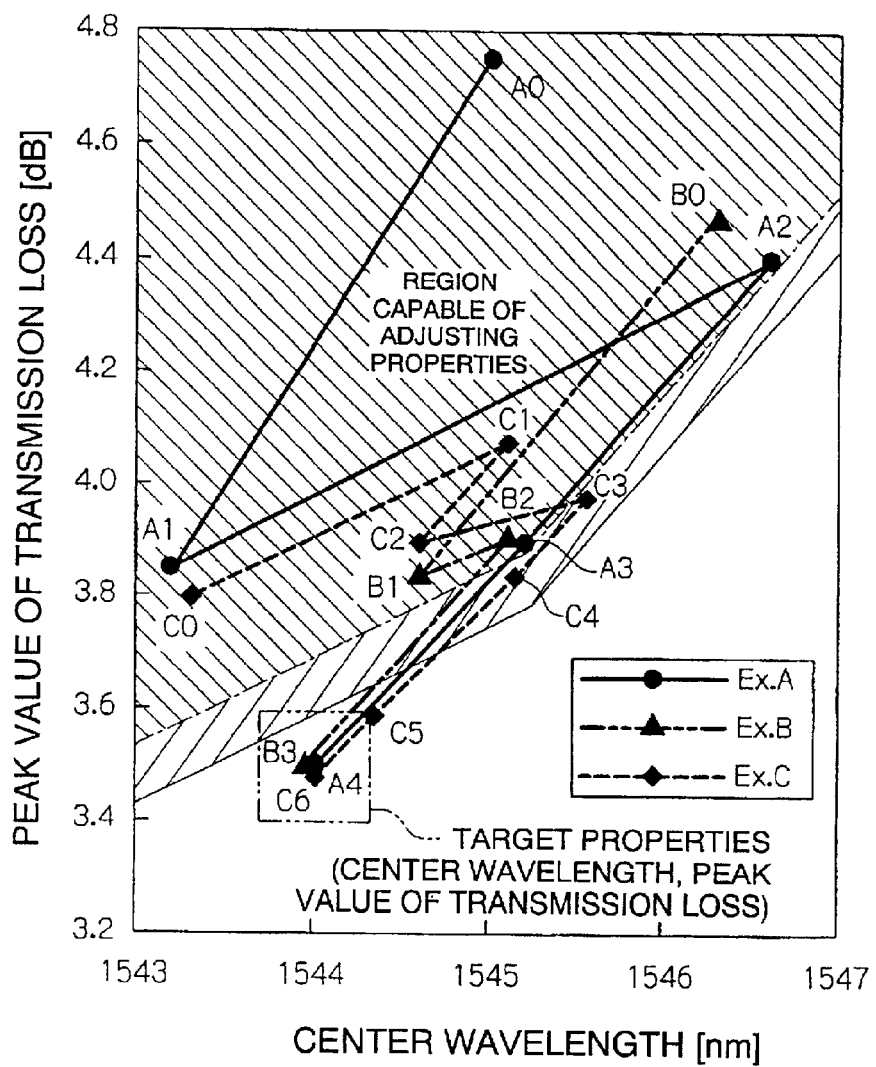

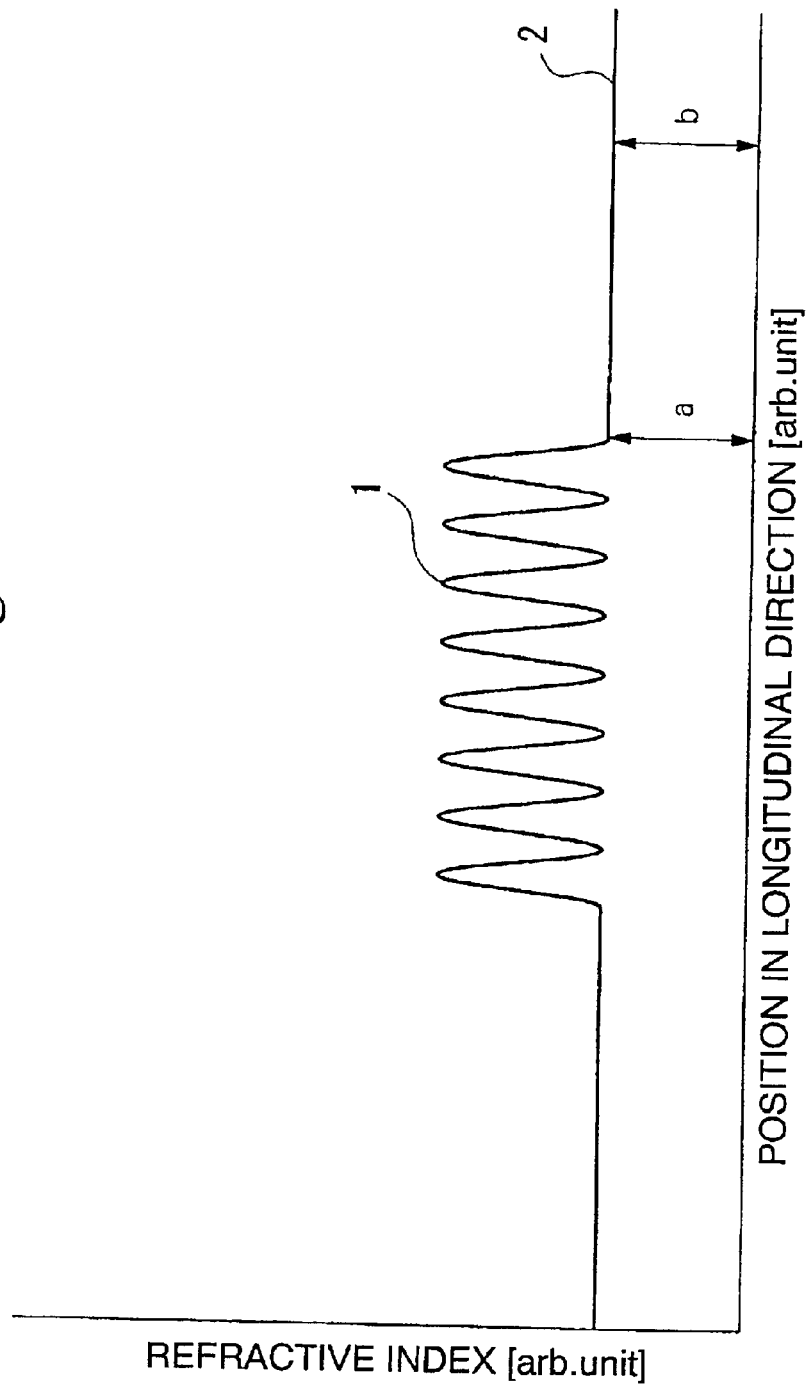

OPTICAL FIBER GRATING, OPTICAL FIBER GRATING MANUFACTURING METHOD, AND OPTICAL FIBER GRATING MANUFACTURING APPARATUS

BACKGROUND OF THE INVENTION

1. Field of the Invention

The present invention relates to a manufacturing method for an optical fiber grating used in an optical communication system (hereinbelow, referred to simply as an "optical fiber grating), and in particular, an optical fiber grating, a manufacturing method for the same, and a manufacturing apparatus for the same that allows fine adjustment of the optical properties of the optical fiber grating, and greatly improves the manufacturing yield.

2. Description of the Related Art

An optical fiber grating is a device having the property of attenuating the light of a specific frequency by coupling it in a reflection mode, a cladding mode, or a radiation mode. A type that couples the light of a specific wavelength with the cladding mode or radiation mode in the same direction as the incident light is called a transmission type, and a type that couples with light of a specific wavelength with a waveguide mode (this includes the core mode and reflection mode), cladding mode, or radiation mode in the direction opposite to the incident light is called a reflecting type.

In the spectrum of the reflected light or the transmitted light of the optical fiber grating, a peak is obtained by attenuating light of certain wavelengths, and the size of this peak is called the rejection ratio, the wavelength of its center is called the central wavelength, and the size of the band of the peak is called the rejection bandwidth.

Irrespective of whether the optical fiber grating is of a long-period type or a short-period type, in the case that the optical fiber grating is used as an optical attenuating device such as a gain equalizer, attenuator, band erase filter, or the like, the transmitted light is monitored, and the transmission loss is used as the rejection ratio. In contrast, in the case that the optical fiber grating is used as a reflector (mirror), a wavelength separation device, or the like, the reflected light is monitored, and the reflection rate is used as the rejection ratio.

The optical fiber grating is obtained by forming a grating part having a constant periodic change, for example, a periodic change of the refractive index of the core, in the longitudinal direction of an optical fiber. In order to produce this periodic change in the refractive index, usually ultraviolet light is used. As a method of manufacturing the grating part using ultraviolet light, the following method is generally carried out.

First, the optical fiber is exposed to hydrogen gas (hereinbelow, referred to simply as "hydrogen loading"), and the sensitivity of the optical fiber (in particular its core) to fluctuation of the refractive index caused by ultraviolet light is increased. In addition, by irradiating ultraviolet light at a predetermined period along the longitudinal direction of the optical fiber (core), the refractive index of the irradiated part is increased, and the grating part is formed. In the irradiation of the ultraviolet light, methods such as the interference exposure method, the phase mask method, the amplitude mask method, the exposure to a focused beam method, and the like are used, and in each of these methods, the refractive index of the part exposed to the ultraviolet light is increased, and refractive index fluctuation along the longitudinal direction of the optical fiber can be formed.

In addition, there is the case in which the period is a constant interval, and the case in which a chirped pitch, in which the period changes along the longitudinal direction of the optical fiber, is applied. In addition, in order to realize the reflection type, a short period type is necessary, and in order to realize a transmission type, a long period type is necessary.

Moreover, the core of the optical fiber comprises silica glass doped with germanium, and the germanium plays the role of increasing the refractive index of the silica glass by being irradiated with ultraviolet light. Depending on the case, an optical fiber having a part or all of the cladding provided around the core also doped with germanium is used, and the refractive index that changes periodically is formed in the cladding as well. In addition, there is the case in which an optical fiber having only the cladding doped with germanium is used, and a periodic change in the refractive index is formed only in the cladding.

It is known that the refractive index of the silica is increased when doped with germanium, and in the case that the cladding is doped with germanium, in order to adjust the refractive index of the core and cladding, generally doping is carried out using one or several kinds of other dopants.

Aluminum and phosphorus are known as dopants that increase the refractive index of silica glass. In addition, boron and fluorine are known as dopants that act to lower the refractive index. That is, in the case that the cladding is doped with germanium, in order to compensate the increase in the refractive index due to the doping with germanium, boron or fluorine, for example, can be added.

Following the ultraviolet light irradiation processing, preferably, the change in the refractive index of the cladding is suppressed by carrying out dehydrogenation processing, and long term stabilization of the optical properties can be implemented.

Furthermore, preferably as a method for adjusting the loss or reflection of the central wavelength (hereinbelow, referred to as the "central wavelength") and improving the manufacturing yield, heat processing or uniform irradiation in which the cladding as a whole is irradiated by ultraviolet light (hereinbelow, referred to as "uniform ultraviolet irradiation") is carried out.

Specifically, by the uniform ultraviolet irradiation, along with the increasing average refractive index, the central wavelength is shifted to a longer wavelength. In addition, by the heat processing, the refractive index change is made small, which is to say that the average refractive index is made small, and the central wavelength is shifted to a shorter wavelength. Therefore, in the case that the central wavelength of the manufactured optical fiber grating is a shorter wavelength that the desired value, the central wavelength is adjusted by uniform ultraviolet irradiation, and in the case that it is a longer wavelength, the central wavelength is adjusted by carrying out heat processing. In the conventional method, only the central wavelength is given attention, and thus only one of either uniform ultraviolet irradiation or heat processing is carried out.

Finally, heat aging is carried out in order to provide thermal stability.

However, recently in the case that a band rejecting filter or the gain equalizer for an optical amplifier, for example, is formed using optical fiber grating, in addition to a precise central wavelength, a very precise rejection ratio is required.

However, in the conventional method, in the processing of adjusting the central wavelength by heat processing or uniform ultraviolet irradiation, the rejection ratio changes.

For example, in the cladding part, the amount of refractive index change caused by excitation by ultraviolet light becomes small due to heating, and as a result, the rejection ratio becomes small.

Therefore, if only the central wavelength is of concern, it can be controlled comparatively stably, but there is no adjustment mechanism for the rejection ratio, and while the optical properties of the product can be stably maintained, there is difficulty in guaranteeing a high yield.

In addition, the change of the refractive index of the optical fiber grating is sensitive to the heat environment (that is, thermal instability) particularly after ultraviolet irradiation, and stably maintaining the stability of the optical properties in this environment over the long term is difficult.

In consideration of the above described problems, it is an object of the present invention to present a method and apparatus that controls the central wavelength and rejection ratio with high precision, and at the same time precisely adjusts and thermally stabilizes the optical properties during manufacture of the optical fiber grating.

SUMMARY OF THE INVENTION

In order to resolve the above-described problems, in the present invention, the following resolution device is proposed. According to the optical fiber grating manufacturing method of the present invention, the uniform ultraviolet irradiation processing and the heat processing are carried out in a suitable combination, and thereby, the central wavelength of the optical fiber grating and the rejection ratio at the central wavelength can be adjusted, and an optical fiber grating having the target optical properties can be obtained.

A first aspect of the present invention is a manufacturing method for an optical fiber grating comprising the steps of: forming a grating part having a periodic refractive index distribution by irradiating an optical fiber along the longitudinal direction by ultraviolet light at a predetermined period and carrying out dehydrogenation when necessary; carrying out at least one time uniform ultraviolet irradiation processing that irradiates the grating part as a whole with ultraviolet light; and carrying out heat aging in order to stabilize the optical properties of the grating part.

Moreover, before the grating part formation processing, preferably a hydrogen loading treatment is carried out, and in the case that hydrogen loading treatment is carried out, dehydrogenation processing is preferably carried out before the uniform ultraviolet irradiation processing.

A second aspect of the present invention is a manufacturing method for an optical fiber grating according to the first aspect wherein, before or after the uniform ultraviolet irradiation processing, heat trimming processing is carried out at least one time by heating the grating as a whole in order to adjust the optical properties.

A third aspect of the present invention is a manufacturing method for an optical fiber grating according to aspects 1 or 2 wherein the uniform ultraviolet irradiation processing and the heat trimming processing are repeatedly carried out an arbitrary number of times and in an arbitrary sequence.

A fourth aspect of the present invention is a manufacturing method for an optical fiber grating according to aspects 1, 2, or 3 wherein the uniform ultraviolet irradiation processing and the heat trimming processing are carried out while monitoring the transmitted light, the reflected light, and the reference light of the optical fiber.

A fifth aspect of the present invention is an optical fiber grating comprising a grating part having a periodic refractive index distribution due to irradiation of the optical fiber along the longitudinal direction by ultraviolet light at a predetermined period and a sample fiber having a constant refractive index wherein: the minimum refractive index of the grating part is larger than the refractive index of the sample fiber, and the variation of the smallest refractive index of the grating part is sufficiently smaller than the amount of change in the periodic refractive index.

A sixth aspect of the present invention is a manufacturing apparatus for an optical fiber grating providing an ultraviolet irradiating apparatus and a heating apparatus for adjusting the optical properties of the optical fiber grating.

A seventh aspect of the present invention is a manufacturing apparatus for an optical fiber grating according to aspect 6 wherein a mechanism that implements the uniform ultraviolet irradiation processing and the heat trimming processing maintains a constant tension on the optical fiber.

According to the optical fiber grating apparatus of the present invention, the optical properties of the optical fiber grating are measured, and depending on the results of this measurement, suitable ultraviolet irradiation processing and heat processing can be easily carried out. In addition, the tension of the optical fiber can be maintained at a suitable constant by a tension maintaining mechanism provided on the fiber clamp, and thereby modulation or fluctuation of the optical propertied due to insufficient or excess tension or changes in the tension can be prevented, and precise control of the optical properties becomes possible.

BRIEF DESCRIPTION OF THE DRAWINGS

FIG. 6 is a drawing for explaining the changes in the optical properties of the optical fiber grating during the heat trimming, the uniform ultraviolet irradiation processing, an the heat aging in the embodiment of the present invention.

FIG. 8 is a drawing for explaining the refractive index distribution along the longitudinal direction of a conventional optical fiber grating.

DETAILED DESCRIPTION OF THE INVENTION

Examples of the optical fiber grating, the optical fiber grating manufacturing method, and the optical fiber grating manufacturing apparatus of the present invention will be explained referring to FIG. 1 to FIG. 8.

First, an example of the optical fiber grating manufacturing apparatus of the present invention will be explained.

Figure 1:
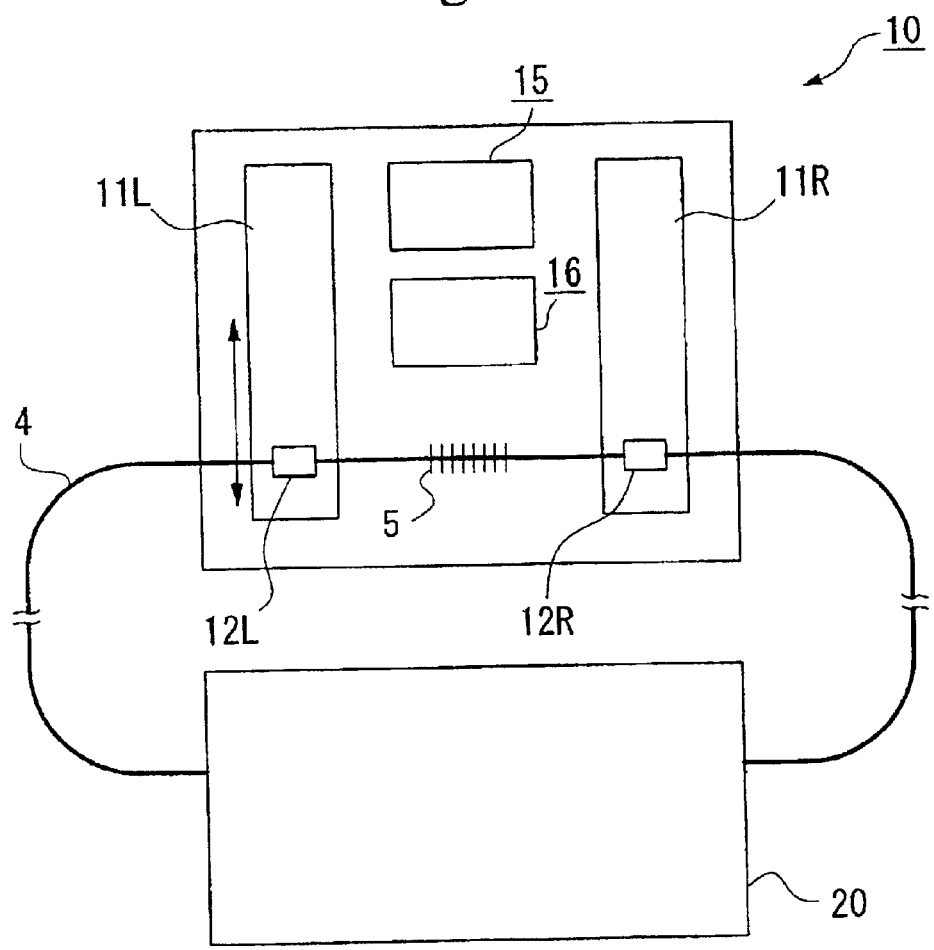
FIG. 1 is a drawing for explaining the optical fiber grating manufacturing apparatus in the embodiments of the present invention.

FIG. 1 is a schematic drawing for explaining the optical fiber grating manufacturing apparatus of the present invention, and as an embodiment, shows the case therein the optical fiber grating part is formed.

In FIG. 1, the optical fiber 4 is anchored by the fiber clamps 12R and 12L disposed on the automatic stages 11R and 11L provided on both sides of the manufacturing apparatus 10. At the center of the manufacturing apparatus 10, a heating apparatus 15 such as a heater and an ultraviolet irradiation apparatus 16 are disposed, the optical fiber is moved vertically parallel to the ultraviolet irradiating apparatus 16 and the heating apparatus 15 due to the automatic stages 11R and 11L in a clamped state, it undergoes each processing, and thereby a grating part 5 is formed.

In addition, on the fiber clamp 12R, a tension adjustment mechanism is provided, and the processing can be carried out while maintaining the tension of the optical fiber 4 at a constant value, and changes in the optical properties due to fluctuations in the tension do not occur.

Both ends of the optical fiber 4 are connected to an optical property measuring system 20 including, for example, a light source and an optical spectrum analyzer, and the optical properties of the grating part 5 can be confirmed to be the specified values.

Figure 2:
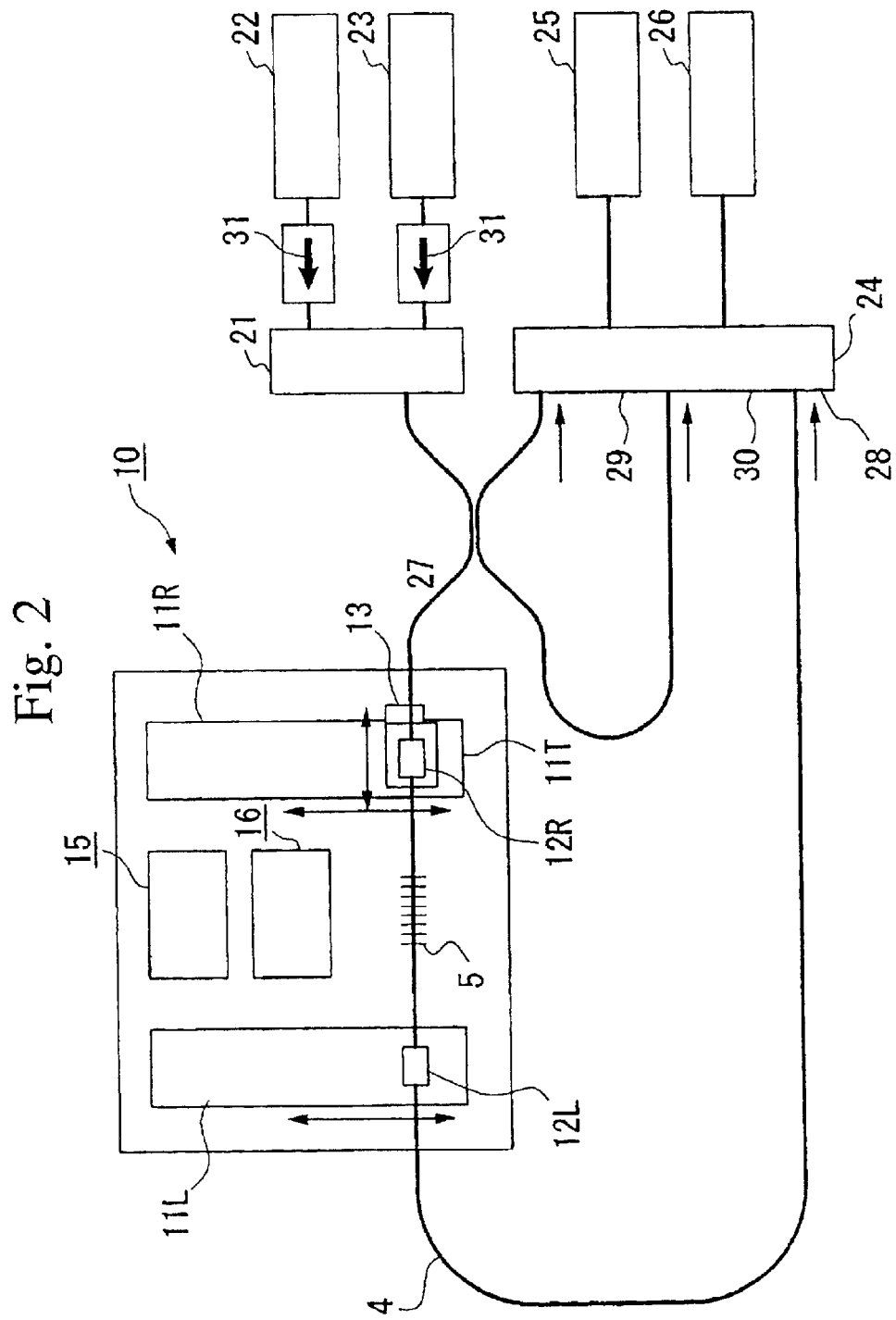
FIG. 2 is a drawing for explaining the detailed embodiments of the optical fiber grating manufacturing apparatus of the present invention.

FIG. 2 is a drawing for explaining in further detail the optical fiber grating manufacturing apparatus 10 described above. The optical fiber 4 is maintained by the fiber clamps 12R and 12L on the automatic stages 11R and 11L, and by being moved parallel to the vertical axis, undergoes heat processing and ultraviolet irradiation processing. On the fiber clamp 12R, a load cell 13 is integrally provided, the tension of the optical fiber 4 is detected by the load cell 13, and by the automatic stage 11T that moves on an axis to the left and right in the figure, a predetermined pressure can be maintained on the optical fiber 4. With this tension maintaining mechanism, a long spring that has a large shift, that is to say, a small spring constant, with respect to the strain of the optical fiber 4, is used.

The structure of the measuring system of the optical properties of the optical fiber 4 will be explained according to its operation. Specifically, when the broadband light from a variable wavelength LD 22 and an ASE light source, or a broadband light source 23 such as an SLD is output, this light is input into the fiber 4 via the optical switch 21, and is split into equal portions at the 3 dB coupler 27. One part of the split light is transmitted through the grating part 5, and this transmitted light is received at the transmitted light monitor 28 provided on the optical switch 24 at the other end of the optical fiber 4. The returning light from the optical switch 21 destabilizes the operation of the variable wavelength LD 22 and the broadband light source 23, and thus preferably an isolator 31 is used.

The other part of the split light is received at the reference light monitor 30 provided at this optical switch 24. In contrast, the reflected light that was reflected at the grating part 5 is received at the reflected light monitor 29 provided on the optical switch 24 via the 3 dB coupler 2.

The transmitted light, reference light, and the reflected light can be monitored by the light power meter 25 and the optical spectrum analyzer 26, which are connected to the optical switch 24. In addition, the manufacturing of the grating part 5 and adjustment of the optical properties can be carried out while confirming the optical properties of the grating part 5.

Moreover, one of either the reflected light and the transmitted light can be monitored, depending on the properties of the grating part 5. That is, the transmitted light is monitored in the case of a transmission type optical fiber grating, and the reflected light is monitored in the case of a reflection type optical fiber grating. In addition, the reference light is monitored in order to observe the properties of the input light.

According to the manufacturing apparatus 10 of the optical fiber grating of the present invention, even when processing a grating part 5 having differing irradiation conditions for the ultraviolet light and heating conditions due to differing optical properties, because processing can be carried out by appropriately moving the optical fiber 4 with the automatic stages 11L and 11R, heat processing and ultraviolet irradiation processing of the optical fiber 4 can be carried out using the manufacturing apparatus 10, which has one platform, without changing the apparatus. Thereby, compared to the case of using a heat processing apparatus and ultraviolet irradiation apparatus that are separate, manufacturing accidents such as damage or breakage or deterioration of the product quality that occur when the optical fiber 4 is moved from one apparatus to another can be prevented.

In addition, the optical properties of the grating part 5 fluctuate easily due to sensitivity to the tension of the optical fiber 4, but according to the manufacturing apparatus 10 of the present invention, because a tension adjusting mechanism is mounted on the clamp part 12R for the optical fiber 4, the tension can be maintained at a constant even during the heat processing and uniform ultraviolet irradiation processing, fluctuations of the optical properties of the grating part 5 can be prevented, and the adjustment of the optical properties can be carried out easily.

Next, the manufacturing method of the optical fiber grating of the present invention will be explained.

In this example, preferably after the hydrogen loading treatment, ultraviolet irradiation that forms the grading part 5 is carried out by irradiating ultraviolet light at a predetermined period along the longitudinal direction of the optical fiber (grating part formation processing) according to conventional methods such as the phase mask method. Furthermore, preferably after carrying out the a dehydrogenation processing, uniform ultraviolet irradiation processing that irradiates the grating part 5 as a whole by ultraviolet light is carried out at least one time after the formation of the grating part 5, and according to necessity, before or after the uniform ultraviolet irradiation processing, heat trimming processing that adjusts of the optical properties by carrying out heat processing on the grating part 5 as a whole is performed, and finally heat aging processing is always carried out.

In addition, in case of further necessity, uniform ultraviolet irradiation and heat trimming are carried out in an arbitrary sequence and an arbitrary number of times to adjust the optical properties of the optical fiber grating.

First, the hydrogen loading treatment is carried out by exposing the optical fiber, for example, to a 100-atmosphere hydrogen gas atmosphere at 20 to 60° C. for 7 to 14 days. In addition, the formation of the grating part by irradiation by ultraviolet light at a predetermined period is carried out by, for example, irradiating ultraviolet light in the wavelength neighborhood of 240 nm using an excimer laser. Moreover, an optical fiber is used whose core comprises silica glass doped by germanium and whose cladding provided on the outside thereof comprises pure silica glass. In addition, as described above, depending on the use, both an optical fiber having both the core and cladding or just the cladding doped with germanium can be used. In this case, because germanium has the effect of increasing the refractive index just by doping the silica glass, the refractive index can be adjusted by adding other dopants such as fluorine, boron, or aluminum.

In addition, the dehydrogenation processing is carried out by exposing the optical fiber to the atmospheric air at 100 to 150° C. for 12 to 13 hours.

Figure 3A:
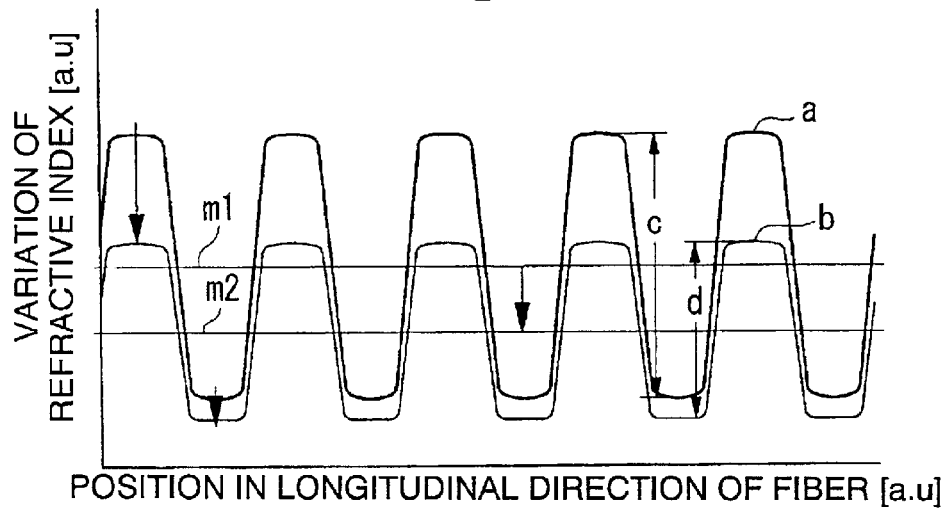
FIGS. 3A and 3B are schematic drawings showing the amount of change of the refractive index respectively for the case (FIG. 3A) in which the optical fiber grating undergoes heat trimming processing and the case (3B) in which it undergoes uniform ultraviolet irradiation processing.
Figure 3B:
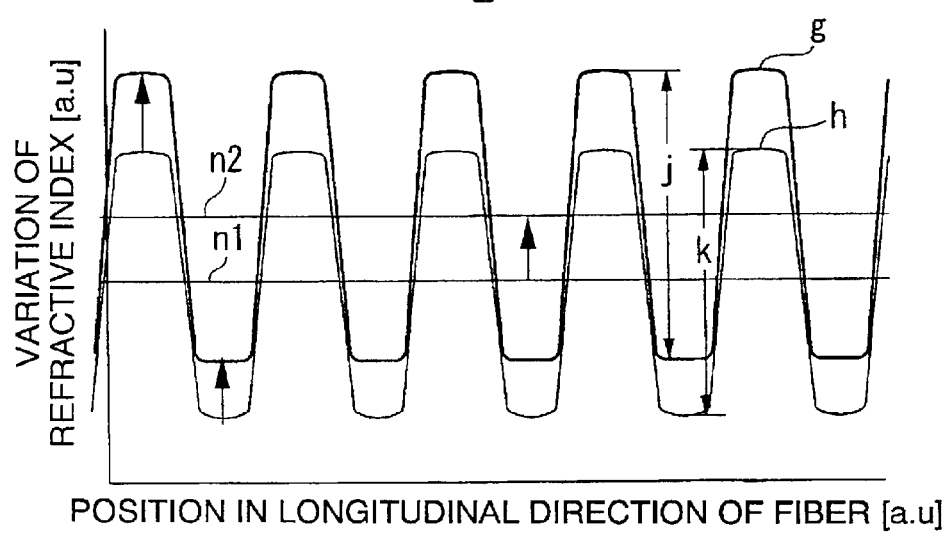

FIGS. 3A and 3B is a drawing that shows the change in the amount of the refractive index of the grating part 5 in the case of carrying out heat trimming (FIG. 3A) and the case of carrying out uniform ultraviolet irradiation (FIG. 3B). Moreover, in the example described below, a single mode fiber having an outer diameter of 125 $\mu$m whose core comprises germanium doped silica glass and whose cladding comprises pure silica glass.

With regards to the change in the refractive index of during the heat trimming processing (a: before heating; b: after heating), because the amplitude of the change in the refractive index (c: before heating; d: after heating) becomes small by using the heat trimming processing and the the coupling constant between modes of the grating part 5 becomes small, the rejection ratio becomes small. In addition, because the average refractive index (m1: before heating; m2: after heating) becomes small due to heating, the central wavelength shifts to the shorter wave side.

In contrast, when looking at the change in the refractive index due to the uniform ultraviolet irradiation processing (h: before irradiation; g: after irradiation), the amplitude of the change in refractive index (k: before irradiation; j: after irradiation) hardly changes during the irradiation. However, in fact, the location exposed to light due to the ultraviolet irradiation have a large degree of increase in the refractive index due to the subsequent uniform ultraviolet irradiation, and thus the coupling constant between modes of the grating part 5 becomes somewhat large, and the rejection ratio rises slightly. In addition, the average refractive index rises from n1 to n2, and thus the center wavelength is shifted to the longer wavelength side.

As described above, in the case of the heat trimming processing and the case of the uniform ultraviolet irradiation, the proportion of fluctuation of the central wavelength and the fluctuation of the change in the refractive index differs. In the present invention, the optical properties can be precisely adjusted over a broad range by exploiting the difference in the effect of both processes.

Figure 4:
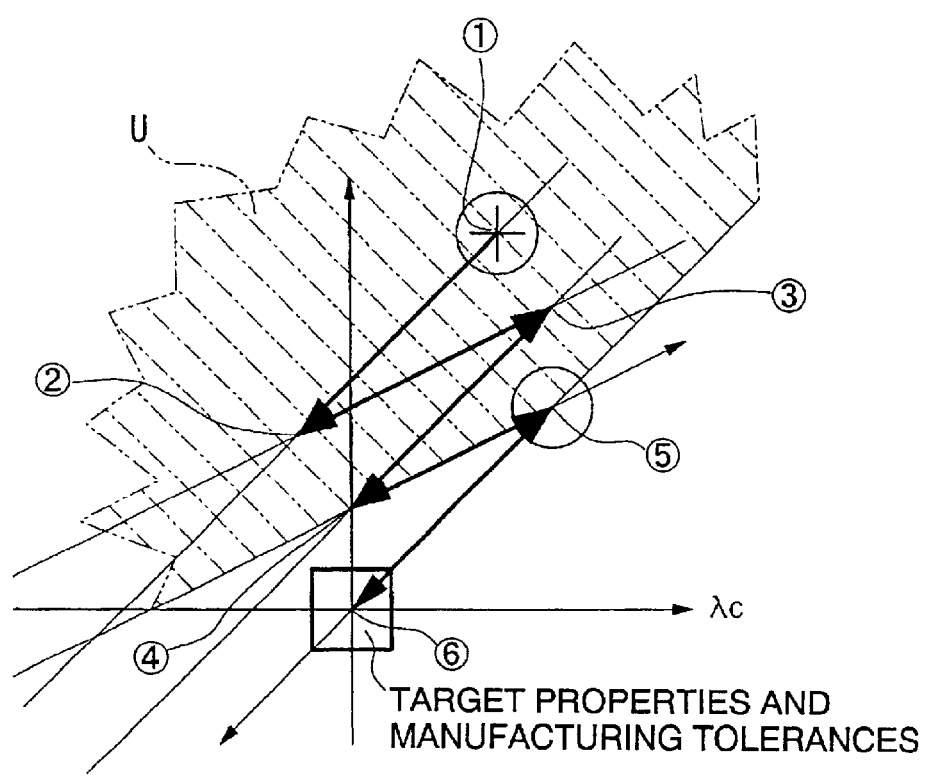
FIG. 4 is a drawing for explaining the change in the optical properties of the optical fiber grating during the heat trimming processing and the uniform ultraviolet irradiation processing.

FIG. 4 shows the change in optical properties of the optical fiber grating during heat trimming processing and the uniform ultraviolet irradiation processing, wherein the abscissa is the central wavelength $\lambda c$ and the ordinate is the rejection ratio (transmission loss) $\Delta L$ in the central wavelength. Moreover, the rejection bandwidth is determined by the number of grating steps (the number of periodic changes in the refractive index). Because the number of grating steps does not change depending on the heat trimming processing or the uniform ultraviolet irradiation, the change in the heat processing and ultraviolet irradiation processing in the present invention can be represented by $\lambda c$ and $\Delta L$.

That is, no matter where the location within the hatching in FIG. 4 the optical properties after the dehydrogenation processing of the optical fiber 4 are to be positioned, the final optical properties of the grating part 5 can be adjusted to predetermined properties (the point in the coordinate system denoted by the $\hat{6}$) by carrying out in appropriate combination optimal heat trimming processing and uniform ultraviolet irradiation processing.

The specific conditions of the heat trimming processing and the uniform ultraviolet irradiation processing are not particularly limited, and are appropriately selected depending on the optical properties of the optical fiber grating. In addition, in the configuration of these combinations, the heat trimming processing and the uniform ultraviolet irradiation processing can be alternately carried out at least one time.

As described above, the concrete conditions can be suitably adjusted while monitoring the optical properties (rejection ratio, central wavelength, rejection bandwidth) in the optical measuring system in pilot studies or during manufacture.

One example of these conditions would be carrying out the heat trimming processing at 200 to 300° C. for 1 to 10 hours, and in the uniform ultraviolet irradiation processing, using an excimer laser or a mercury lamp, the ultraviolet light can be irradiated a plurality of times if necessary until a predetermined amount of increase in the refractive index is obtained.

In addition, for example, after carrying out the sequence of heat trimming processing, uniform ultraviolet irradiation processing, and heat trimming processing, finally the heat aging described below can be carried out.

To endure thermal stability, the final processing of this grating part 5 requires that heat aging be carried out. Therefore, in FIG. 4, in order to obtain the target optical properties denoted by the $\hat{6}$, before the final heat aging, the optical properties in the neighborhood of the $\hat{5}$ must be obtained. That is, the grating part 5 having the optical properties denoted by the $\hat{1}$ can be made to have in advance the optical properties denoted by the $\hat{5}$ by heat trimming processing and uniform ultraviolet irradiation processing.

The heat aging is carried out under the conditions, for example, of 200 to 300° C. or 5 to 10 minutes.

In FIG. 4, the transition from $\hat{1}$ to $\hat{2}$, $\hat{3}$ to $\hat{4}$, and $\hat{5}$ to $\hat{6}$ show the state of change due to the heat trimming processing, and the transition from $\hat{2}$ to $\hat{3}$ and $\hat{4}$ to $\hat{5}$ show the state of change due to the uniform ultraviolet irradiation processing. Specifically, because the slopes of the transition lines of the heat trimming processing and the uniform ultraviolet irradiation processing are different, it is clear that by carrying out in appropriate combination the heat trimming processing and the uniform ultraviolet irradiation processing, the optical properties that are the target can be obtained.

Figure 5A:
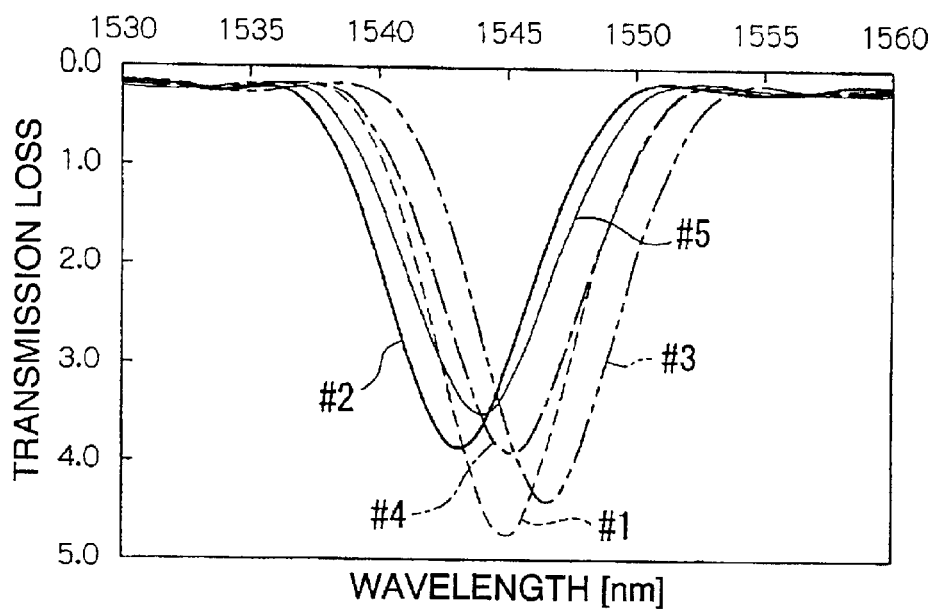
FIGS. 5A and 5B are drawings for explaining the transitions of the transmission loss spectrum (FIG. 5A) and the transmission loss peak (FIG. 5B) of the optical fiber grating during the heat trimming, uniform ultraviolet irradiation processing, and heat aging in the embodiment of the present invention.

FIG. 5A is an example of applying the manufacturing method of the present invention described above to a long-period fiber grating (LPFG), and shows the relationship between wavelength and transmission loss in the case of forming a grating part 5 with ultraviolet light of, for example, a KrF (krypton fluoride) excimer laser and subsequently, after undergoing dehydrogenation processing, carrying out heat trimming processing and the uniform ultraviolet irradiation processing. Moreover, the long period denotes the period of the change of the refractive index being long.

In the figure, #1 is the optical property curve immediately after the dehydrogenation processing, and shows the relationship between the wavelength and the transmission loss. The curve #2 is the property curve after heating this optical fiber grating; curve #3 is the property curve after further uniform ultraviolet irradiation; and finally, the heat aging processing is carried out, and the product having the optical properties of the curve #5, which is the target property, is obtained.

This means that in this example, heat aging is carried out after carrying out the combination of heat trimming processing once, uniform ultraviolet irradiation once, and heat trimming processing once.

Moreover, if the ultraviolet light of the uniform ultraviolet irradiation on the grating part as a whole must be of a constant intensity, it can be irradiated repeatedly a plurality of times, and the heat trimming processing carried out at 200 to 300° C. for 1 to 10 minutes. In addition, the heat aging is carried out at 200 to 200° C. for 5 to 10 minutes.

Figure 5B:
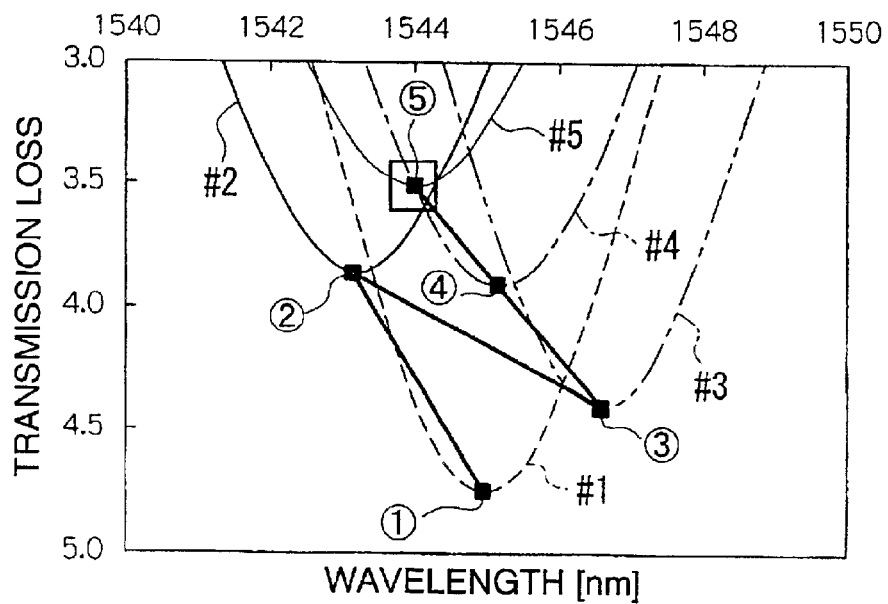

FIG. 5B enlarges the transmission loss peak of each of the curves in FIG. 5A, and their transitions are connected with a line. $\hat{1}$ denotes the peak of curve #1, and $\hat{2}$, $\hat{3}$, $\hat{4}$, and $\hat{5}$ denote the respective peaks of #2, #3, #4, and #5. From $\hat{1}$ to $\hat{2}$, from $\hat{3}$ to $\hat{4}$, and from $\hat{4}$ to $\hat{5}$, the adjustment of the minimum transmission wavelength ($\lambda c$) and the transmission loss ($\Delta L$) due to the heat trimming processing is shown, and from $\hat{2}$ to $\hat{3}$ denotes the similar adjustment by the uniform ultraviolet irradiation processing.

When carrying out the heat trimming processing, both $\lambda c$ and $\Delta L$ decrease, and in the case that uniform ultraviolet irradiation processing is carried out, both $\lambda c$ and $\Delta L$ increase. The amount of change in $\lambda c$ and $\Delta L$ during the heat processing can be controlled by the heating temperature and the heating time, and during the uniform ultraviolet irradiation processing, can be controlled by the amount of ultraviolet light and the irradiation time.

Next, using FIG. 6, the case focusing on the change in $\lambda c$ and $\Delta L$ well be explained with regards to the adjustment method of the optical properties of the optical fiber grating.

FIG. 6 shows an example of a method of adjusting the optical properties of the optical fiber grating while monitoring $\lambda c$ and $\Delta L$ before and after the heat trimming processing, the uniform ultraviolet irradiation processing, and the heat aging processing.

First, the case of sample A will be explained. A0 to A4 show the transition in the optical properties of sample A. A0 shows the optical properties after the dehydrogenation processing. A0 to A1 show the change in optical properties of the optical fiber grating due to the heat trimming processing. A1 to A2 show the change in optical properties of the optical fiber grating due to the uniform ultraviolet irradiation processing. A2 to A3 show the change in optical properties of the optical fiber grating due to the heat trimming processing, and A3 to A4 show the change in the optical properties of the optical fiber grating due to the heat aging processing. By undergoing this type of processing, the sample A arrives at A4, which is the target property. This sample A is identical to the sample shown in FIG. 5.

Next, sample B will be explained. B0 to B3 show the transition in optical properties of sample B. B0 shows the optical properties after the dehydrogenation processing. B0 to B1 show the change in optical properties of the optical fiber grating due to the heat trimming processing. B1 to B2 show the fluctuation in optical properties of the optical fiber grating due to the uniform ultraviolet irradiation processing. B2 to B3 show the fluctuations in the optical properties of the optical fiber grating due to the heat aging processing. By undergoing this type of processing, the sample B arrives at B3, which is the target property. As shown in this example, the processing before the heat aging processing can eliminate the heat trimming processing, and use only uniform ultraviolet irradiation processing.

Next, sample C will be explained. C0 to C6 show the transition in the optical properties of sample C. C0 shows the optical properties after the dehydrogenation processing. C0 to C1 show the change in optical properties of the optical fiber grating due to the uniform ultraviolet irradiation processing. C1 to C2 show the change in optical properties of the optical fiber grating due to the heat trimming processing. C2 to C3 show the change in optical properties of the optical fiber grating due to the uniform ultraviolet irradiation processing, and C3 to C4 show the change in the optical properties of the optical fiber grating due to the heat trimming processing, and C4 to C5 and C5 to C6 show the changes in the optical properties of the optical fiber grating due to the heat aging. By undergoing this type of processing, the sample C arrives at C6, which is the target property. As shown in this example, property adjustment does not necessarily have to start from the heat trimming processing, and depending on necessity, can start from the uniform ultraviolet irradiation processing. In addition, concerning the heat aging processing as well, by carrying out the predetermined amounts described above, long term stabilization of the optical properties can be implemented, and thus depending on necessity, the heat aging processing can be carried out a plurality of times.

As described above, according to the manufacturing method for an optical fiber grating of the present invention, adjustment of the heat trimming processing and the uniform ultraviolet irradiation processing carried out after the dehydrogenation can be easily carried out, and thus by suitably combining both processes, a grating part 5 having the target optical properties precisely adjusted can be obtained at high efficiency and a high yield.

Next, an example of the optical fiber grating of the present invention will be explained.

Figure 7:
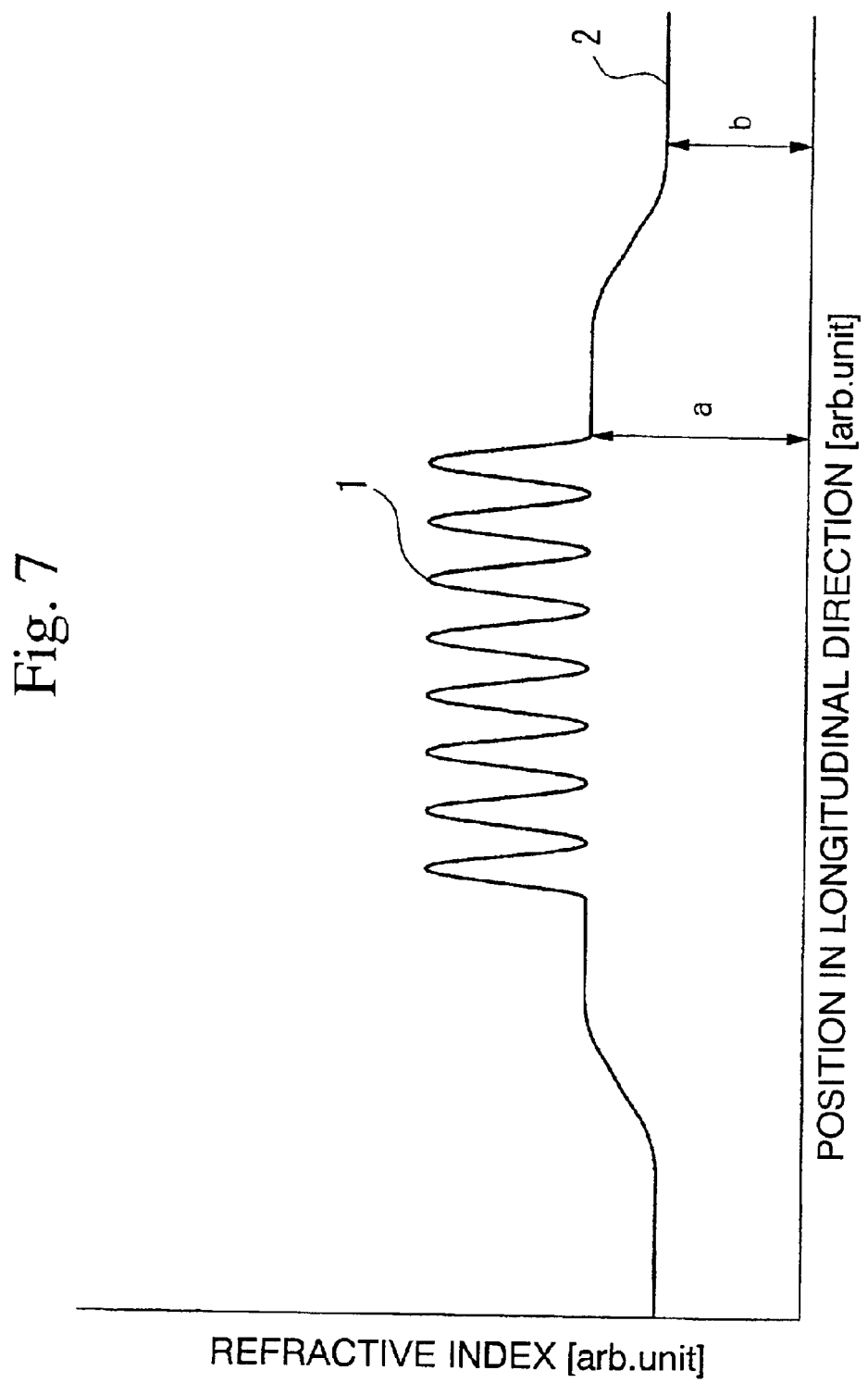
FIG. 7 is a drawing for explaining the refractive index distribution along the longitudinal direction of the optical fiber grating of the present invention.

This example relates to an optical fiber grating manufactured by a manufacturing method for an optical fiber grating that suitable combines heat trimming processing and uniform ultraviolet irradiation processing, and an example of the refractive index distribution along the longitudinal direction of the optical figure grating is shown in FIG. 7.

This optical fiber grating is characterized in that the minimum refractive index a of the refractive index changing part 1 of the grating part is larger than the refractive index b of the optical fiber 2 that serves as the sample material, and the variation of the minimum refractive index a of the refractive index change part 1 of the grating part is sufficiently smaller than the amount of change in the periodic refractive index. Concerning this point, as shown in FIG. 8, the refractive index distribution of the optical fiber grating manufactured by the conventional manufacturing method for the optical fiber grating is different in that the minimum refractive index a of the refractive index change part 1 of the grating becomes equal to the refractive index b of the optical fiber 2 that serves as the sample material.

Moreover, the variation of the minimum refractive index a of the refractive index change part 1 of this grating part is preferably equal to or less than one tenth the amount of change of the periodic refractive index. Thus, in order to make the variation of the minimum refractive index small, the power of the irradiated ultraviolet light must be made uniform, and in order to do this, the light form the light source must be irradiated via a homogenizer or realized by a means such as using a light source having an output light whose power has been made uniform. This type of ultraviolet irradiation can be carried out in the manufacturing method for an optical fiber grating of the present invention.

According to the manufacturing method for an optical fiber grating of the present invention, because adjustment of the heat processing and uniform ultraviolet irradiation processing carried out after the dehydrogenation processing can be easily carried out, by combining both processes under optimal conditions, an optical fiber grating having precisely adjusted target optical properties can be obtained with high efficiency and at a high yield.

In addition, according to the manufacturing method for an optical fiber grating of the present invention, even when processing different types of optical fiber gratings, the heat processing and ultraviolet irradiation processing of the optical fiber can be carried out on one manufacturing apparatus, and without the need to change apparatuses, and thus manufacturing accidents such as damage, breakage, and product quality deterioration that occur then the optical fibers are transferred between various apparatuses can be prevented.

Furthermore, according to the manufacturing method for an optical fiber grating of the present invention, because a tension adjustment mechanism is provided on the clamp part of the optical fiber, even during the heat processing and ultraviolet irradiation processing for forming the grating part, the tension can be maintained at a constant, change in the optical properties of the optical fiber grating can be prevented, and the adjustment of the optical properties can be carried out easily and precisely.

What is claimed is:

1. A manufacturing method for an optical fiber grating comprising the steps of:

loading hydrogen in a material optical fiber for forming the optical fiber grating in order to increase the photosensitivity of the optical fiber when necessary;

forming a grating part having a periodic refractive index distribution by irradiating an optical fiber along the longitudinal direction with ultraviolet light at a predetermined period and carrying out dehydrogenation when necessary;

carrying out at least once uniform ultraviolet irradiation processing that irradiates the grating part as a whole at a predetermined temperature and time;

carrying out at least once heat trimming processing that uniformly heats the grating part as a whole at a predetermined temperature and time; and carrying out heat annealing processing that heats the grating part to a uniform temperature for a predetermined period in order to stabilize the optical properties of the grating part;

wherein the uniform ultraviolet irradiation processing and the heat trimming processing are carried out alternately as optical property adjusting processing.

2. A manufacturing method for an optical fiber grating according to claim 1 wherein, before or after said uniform ultraviolet irradiation processing, heat trimming processing is carried out at least once by uniformly heating the grating part as a whole in order to adjust the optical properties.

3. A manufacturing method for an optical fiber grating according to claim 1, wherein the uniform ultraviolet irradiation processing and the heat trimming processing are carried out at optional times as optical property adjusting processing until predetermined optical properties of the optical fiber grating are obtained.

4. A manufacturing method for an optical fiber grating according to claim 1, wherein said uniform ultraviolet irradiation processing and said heat trimming processing are alternated and the alternation is carried out at optional times while monitoring one of either the transmitted light or the reflected light, in addition to the reference light of the optical fiber grating.

* * * * *